US011431219B2

(12) United States Patent
Kawai

(10) Patent No.: US 11,431,219 B2
(45) Date of Patent: Aug. 30, 2022

(54) ROTARY ELECTRIC MACHINE UNIT

(71) Applicant: HONDA MOTOR CO., LTD., Tokyo (JP)

(72) Inventor: Norikazu Kawai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 17/201,645

(22) Filed: Mar. 15, 2021

(65) Prior Publication Data

US 2021/0288547 A1 Sep. 16, 2021

(30) Foreign Application Priority Data

Mar. 16, 2020 (JP) ............................ JP2020-045578

(51) Int. Cl.

*H02K 5/22* (2006.01)
*H02K 7/08* (2006.01)
*B60L 50/00* (2019.01)

(52) U.S. Cl.

CPC .............. *H02K 5/22* (2013.01); *H02K 7/083* (2013.01); *B60L 50/00* (2019.02)

(58) Field of Classification Search

CPC ........... H02K 5/22; H02K 7/083; B60L 50/00
USPC ........................................................... 310/89
See application file for complete search history.

(56) References Cited

U.S. PATENT DOCUMENTS

2015/0214812 A1 7/2015 Tooyama et al.

FOREIGN PATENT DOCUMENTS

JP 2015-140059 A 8/2015

*Primary Examiner* — Terrance L Kenerly
(74) *Attorney, Agent, or Firm* — Paratus Law Group, PLLC

(57) ABSTRACT

A protection plate is at least partly provided on a first side surface of a storage case, and includes a first load input area provided outside a first coil end portion in a radial direction and at a position overlapping with a stator core when viewed from the axial direction, and a second load input area provided at a position overlapping with at least one of a bearing and a rotor shaft when viewed from the axial direction. When a load is input to a rotary electric machine unit from the one end side in the axial direction, the load is transmitted to the storage case from the first load input area and the second load input area of the protection plate.

5 Claims, 4 Drawing Sheets

10
20
30(31)
23
26
29
32
57
34a
34
33
35
52
50
U
Rr
R
L
D
Fr 10
20
22
25b
CL
25a
36a
37
54
55
21a
24c
54
21b
21
51
52
32
30
50
24d
35
53
44
24b(24)
23
26
27
29
43
42
29a
31
40(34)
41
24a(24)
L
R
Rr
L
Fr

ROTARY ELECTRIC MACHINE UNIT

CROSS-REFERENCE TO RELATED APPLICATIONS

This application is based on and claims priority under 35 USC 119 from Japanese Patent Application No. 2020-045578 filed on Mar. 16, 2020.

TECHNICAL FIELD

The present disclosure relates to a rotary electric machine unit mounted on an electric vehicle or the like, and more particularly, to a rotary electric machine unit capable of protecting rotary electric machines from a collision load of the vehicle with a protection plate.

BACKGROUND ART

Electric vehicles such as hybrid vehicles, battery-powered vehicles, and fuel cell vehicles are equipped with rotary electric machines such as electric motors and generators. Since the electric vehicles include the rotary electric machines to which high-voltage power is supplied and power cables through which the high-voltage power flows, various studies are conducted on collision accidents.

In the related art, for a side frame that is bent toward the rotary electric machines upon collision, a collision guard is provided on a storage case of the rotary electric machines to prevent damages resulting from the load transferred from the side frame from reaching the rotor and stator. A connector protection structure of a rotary electric machine described in JP-A-2015-140059 includes a storage case for storing the rotary electric machine, a connector installed on an outer surface of the storage case, and a protection member provided between the connector and a side member of the vehicle and fixed to the storage case.

The protection member includes a protection section vertically arranged around the connector, a fixing section linked to the protection section and fixed by a bolt on a rear surface of the storage case, and a support section linked to the fixing section and supported on the side surface by a stud vertically arranged on the side surface of the storage case, to receive the collision load on the side surface of the storage case and prevent the connector from being damaged.

SUMMARY OF INVENTION

However, in recent years, there is a concern that the collision guard of the related art cannot sufficiently cope with the increasing weight of the vehicles and the stricter collision conditions. In the connector protection structure of the rotary electric machine of JP-A-2015-140059, there is no mention of the protection structure to protect the coils of the rotary electric machines from the load at the time of collision such that, when the coils are damaged, short circuit, ground fault, or the like may occur, and accordingly, there is room for improvement.

The present disclosure provides a rotary electric machine unit capable of protecting the coils of the rotary electric machine and preventing the occurrence of short circuit or ground fault when a load is input to the rotary electric machine unit due to a collision or the like.

According to the present disclosure, there is provided a rotary electric machine unit including a rotor shaft, a rotary electric machine including a rotor having substantially annular shape and configured to be fixed to an outer peripheral surface of the rotor shaft, and a stator configured to be provided at a predetermined interval in a radial direction from an outer peripheral surface of the rotor, a storage case configured to store the rotary electric machine, and a protection plate configured to be attached to an outer surface of the storage case, in which a first end portion on one end side of the rotor shaft in an axial direction is pivotally supported by a bearing provided on a first side surface on one end side of the storage case in the axial direction, the stator includes a stator core including a stator yoke portion having a substantially annular shape, and a coil configured to be attached to the stator core inside the stator yoke portion in a radial direction, the coil includes a first coil end portion protruding outward in the axial direction from a first end surface on the one end side of the stator core in the axial direction, the protection plate is at least partly provided on the first side surface of the storage case, and includes a first load input area provided outside the first coil end portion in the radial direction and at a position overlapping with the stator core when viewed from the axial direction, and a second load input area provided at a position overlapping with at least one of the bearing and the rotor shaft when viewed from the axial direction, and when a load is input to the rotary electric machine unit from the one end side in the axial direction, the load is transmitted to the storage case from the first load input area and the second load input area of the protection plate.

According to the present disclosure, the protection plate is at least partly provided on the first side surface of the storage case, and includes a first load input area provided outside the first coil end portion in the radial direction and at a position overlapping with the stator core when viewed from the axial direction, and a second load input area provided at a position overlapping with at least one of the bearing and the rotor shaft when viewed from the axial direction. When a load is input to the rotary electric machine unit from the one end side in the axial direction, the load is transmitted to the storage case from the first load input area and the second load input area of the protection plate. The coil can be protected from the load acting on the rotary electric machine to prevent the occurrence of short circuits and ground faults.

DESCRIPTION OF EMBODIMENTS

Figure 1:
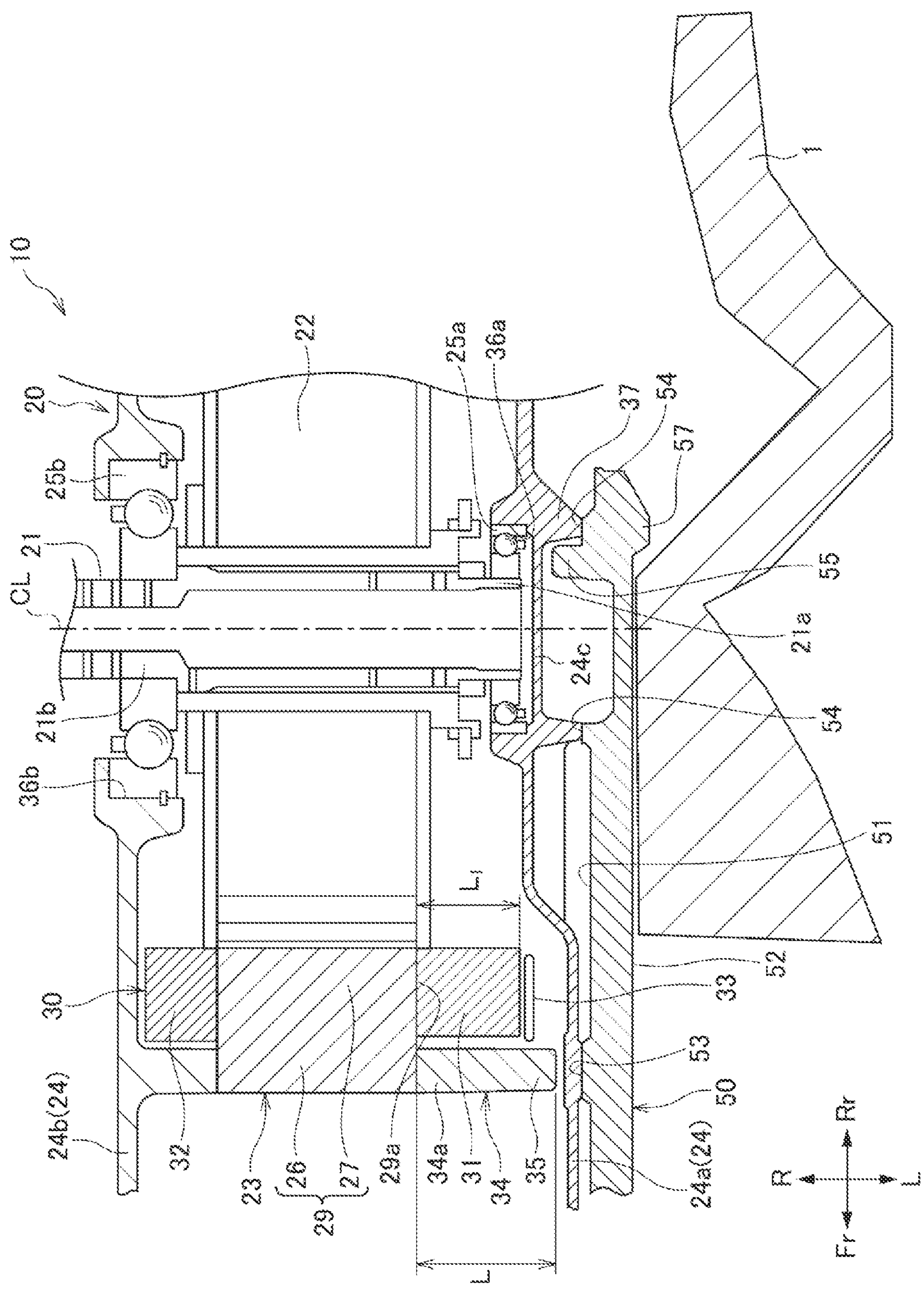
FIG. 1 is a cross-sectional view illustrating a rotary electric machine unit according to an embodiment of the present disclosure.

Hereinafter, embodiments of a rotary electric machine unit according to the present disclosure will be described with reference to the accompanying drawings. In the present embodiment, the rotary electric machine unit is mounted on a vehicle. The drawings shall be viewed in the direction of the symbols such that, in the following description, when "front". "rear", "left", "right", "up" "down" are indicated, according to the direction seen from the driver, "Fr" indicates the front direction of the vehicle in the drawings, "Rr"

indicates the rear direction, "L" indicates the left side, "R" the indicates the right side, "U" indicates the upper direction, and "D" indicates the lower direction.

Figure 2:
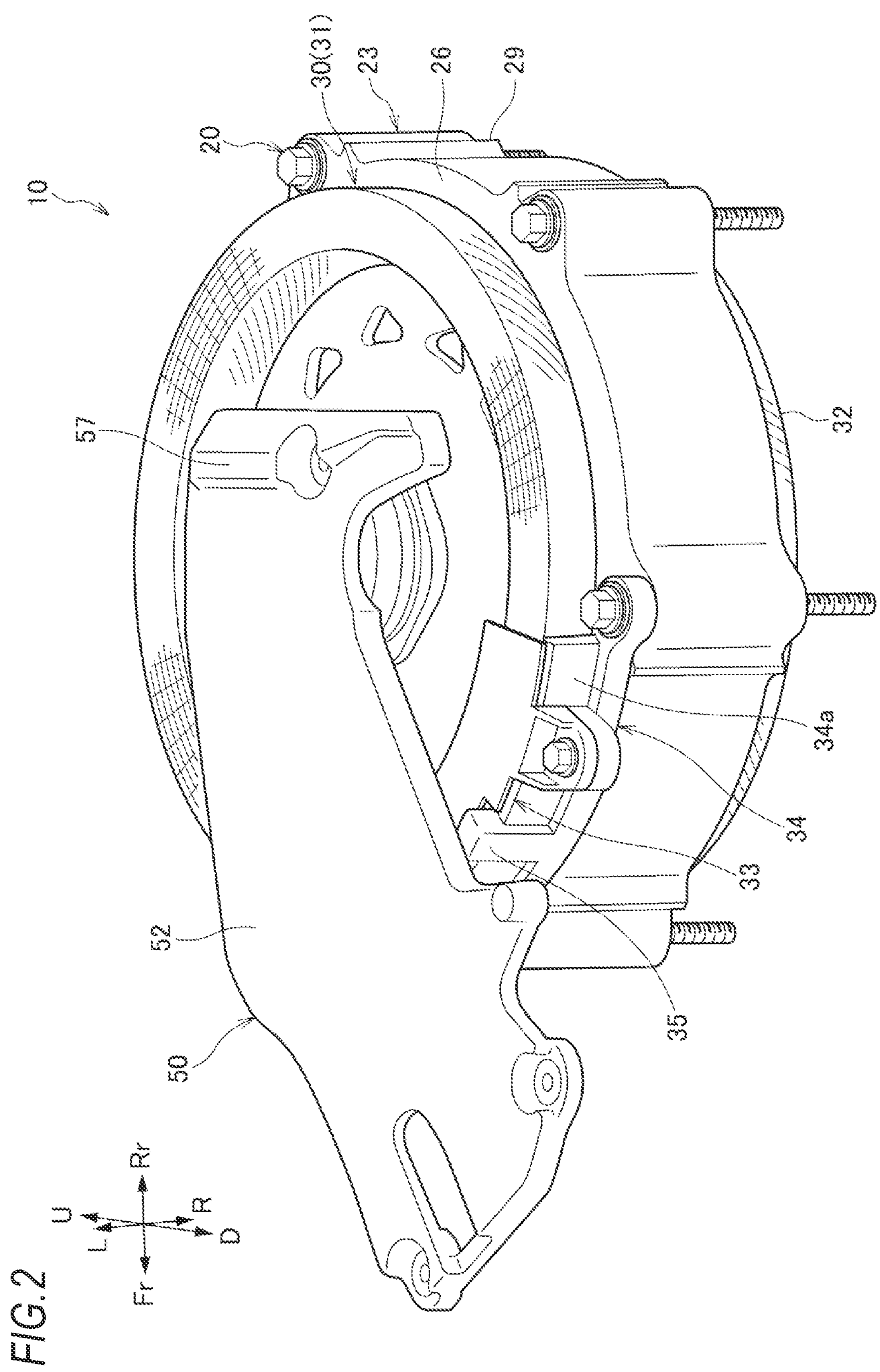
FIG. 2 is a perspective view illustrating the rotary electric machine unit of FIG. 1 from which a storage case is removed, when viewed from diagonally left front.

As illustrated in FIGS. 1 and 2, a rotary electric machine unit 10 according to the present embodiment includes a rotary electric machine 20, a storage case 24 storing the rotary electric machine 20, and a protection plate 50 provided on a left side surface 24*c* of the storage case 24.

(Storage Case)

The storage case 24 includes a first storage case 24*a* and a second storage case 24*b*. The first storage case 24*a* forms the left side surface 24*c* of the storage case 24 and is provided on a left side of the rotary electric machine 20. The first storage case 24*a* faces a left side frame 1 of the vehicle in the left-right direction with a protection plate 50 interposed therebetween. The second storage case 24*b* is provided on a right side of the rotary electric machine 20 on a central side of the vehicle.

A first bearing chamber 36*a* is formed in the first storage case 24*a*, and a first bearing 25*a* is fitted into and fixed in the first bearing chamber 36*a*. A second bearing chamber 36*b* is formed in the second storage case 24*b*, and a second bearing 25*b* is fitted into and fixed in the second bearing chamber 36*b*. On an axially outer surface of the first storage case 24*a* that forms the left side surface 24*c* of the storage case 24, a case protrusion 37 protruding outward in the axial direction toward the protection plate 50 is provided. The case protrusion 37 has a substantially cylindrical shape protruding outward in the axial direction toward the protection plate 50 and is provided at a position overlapping with the first bearing chamber 36*a* when viewed from the axial direction.

(Rotary Electric Machine)

The rotary electric machine 20 includes a rotor shaft 21, a rotor 22 having a substantially annular shape and fixed to and integrally rotating with the rotor shaft 21, and a stator 23 provided at a predetermined interval in a radial direction from an outer peripheral surface of the rotor 22. In the present embodiment, in the rotary electric machine 20, the rotor shaft 21 is extended in a vehicle width direction and provided on the left side of the vehicle, that is, in the vicinity of the left side frame 1.

The rotor shaft 21 includes a left end portion 21*a* rotatably supported by the first bearing 25*a* provided in the first storage case 24*a*, and a right end portion 21*b* rotatably supported by the second bearing 25*b* provided in the second storage case 24*b*.

The stator 23 includes a stator core 29 having a stator yoke portion 26, which has a substantially annular shape, and a coil 30 attached to the stator core 29. The stator core 29 includes a plurality of teeth portions 27 protruding inward in the radial direction from the inner peripheral surface of the stator yoke portion 26, and a plurality of slot portions (not illustrated) formed between the teeth portions 27. The coil 30 is inserted into a plurality of slot portions of the stator core 29 and wound around the teeth portion 27. Therefore, the coil 30 is attached to the stator core 29 inside the stator yoke portion 26 in the radial direction.

The coil 30 includes a first coil end portion 31 protruding from the stator core 29 toward one end side in the axial direction, that is, toward the left side in the vehicle width direction, and a second coil end portion 32 protruding toward the other end side in the axial direction, that is, toward the right side in the vehicle width direction.

A protruding member 34 having a substantially arc shape is fixed to the stator yoke portion 26 of a left end surface 29*a* of the stator core 29 when viewed from the axial direction. The protruding member 34 includes a substantially arc-shaped wall portion 34*a* facing an outer peripheral surface of the first coil end portion 31, and, when the rotary electric machine 20 is viewed from the axial direction on the first coil end portion 31 side, the protruding member 34 covers an outer peripheral surface of the front lower portion of the first coil end portion 31.

The protruding member 34 includes a plurality of protrusions 35 having an axial length L longer than an axial length L1 of the first coil end portion 31 and protruding outward farther than the first coil end portion 31 in the axial direction. The axial length L1 of the first coil end portion 31 is the length from the left end surface 29*a* of the stator core 29 to an outermost end portion of the first coil end portion 31 in the axial direction.

The axially outer surface of the front lower portion of the first coil end portion 31 is covered with a plate-shaped coil cover 33. In the present embodiment, the coil cover 33 is fixed to the protruding member 34. The coil cover 33 is formed of resin, for example. By forming the coil cover 33 with resin, it is not necessary to secure an insulation distance between the first coil end portion 31 and the other members, and compact layout is enabled.

The rotor shaft 21, the rotor 22, the stator 23, the coil cover 33, and the protruding member 34 are stored in the storage case 24.

(Protection Plate)

Figure 3:
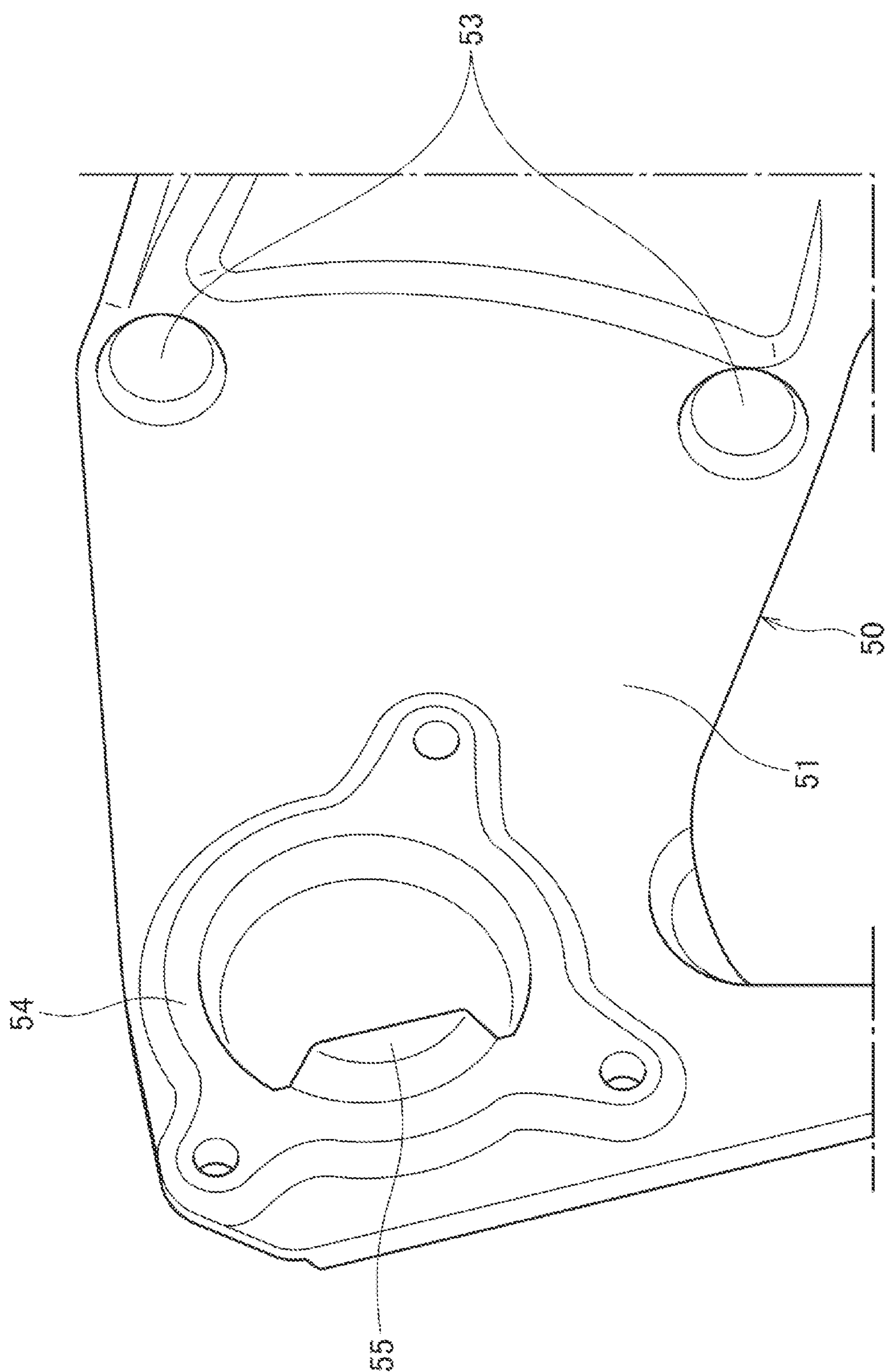
FIG. 3 is a perspective view illustrating an inner side surface of the protection plate of FIG. 2.

As illustrated in FIGS. 1 to 3, the protection plate 50 is provided outside the first storage case 24*a* that forms the left side surface 24*c* of the storage case 24. The protection plate 50 is a substantially plate-shaped member that covers an area in the vicinity of the rotor shaft 21 including the first bearing 25*a* and an area including the protruding member 34 having a substantially arc shape, when viewed from the axial direction. The protection plate 50 includes an inner side surface 51 facing the first storage case 24*a* that forms the left side surface 24*c* of the storage case 24, and an outer surface 52 positioned outside the inner side surface 51 in the axial direction.

In the inner side surface 51 of the protection plate 50, a plurality of (two, in the embodiment illustrated in FIG. 3) first load input areas 53 are provided outside the first coil end portion 31 in the radial direction and at a position overlapping with the stator core 29, that is, at a position overlapping with the stator yoke portion 26 when viewed from the axial direction. The first load input area 53 is in contact with the first storage case 24*a* that forms the left side surface 24*c* of the storage case 24. In the present embodiment, the first load input area 53 is a circular boss protruding inward in the axial direction, and is provided at a position overlapping with the plurality of protrusions 35 of the protruding member 34 when viewed from the axial direction.

The inner side surface 51 of the protection plate 50 is provided with a second load input area 54 at a position overlapping with at least one of the first bearing 25*a* and the rotor shaft 21 when viewed from the axial direction. The second load input area 54 is in contact with the first storage case 24*a* that forms the left side surface 24*c* of the storage case 24. In the present embodiment, the second load input area 54 has a substantially cylindrical shape protruding inward in the axial direction, and is positioned at a position overlapping with the case protrusion 37 of the first storage case 24*a* when viewed from the axial direction. The second load input area 54 is in contact with the case protrusion 37 of the first storage case 24*a*.

Inside the second load input area 54 in the radial direction, an inner protrusion 55 protruding inward in the axial direction is provided. The inner protrusion 55 is provided inside the case protrusion 37 in the radial direction, and is provided to be overlapped at least partly with the case protrusion 37 in the axial direction. In the present embodiment, the inner protrusion 55 is provided on the inner peripheral surface of the second load input area 54 and includes a substantially bow shape when viewed from the axial direction. A gap is provided in the radial direction between the inner protrusion 55 and the case protrusion 37.

The outer surface 52 of the protection plate 50 is provided with an outer protrusion 57 protruding outward in the axial direction. The outer protrusion 57 is formed at the rear end portion of the rotary electric machine 20, and extends substantially linearly in the vertical direction.

(Action of Protection Plate)

Next, the action of the protection plate 50 of the present embodiment will be described.

As illustrated in FIG. 1, when the left front part of the vehicle collides with an obstacle, the left side frame 1 is bent to be contracted in the front-rear direction while being moved rearward relative to the vehicle, and absorbs the energy of the collision. When bent due to the collision, the left side frame 1 is in contact with the protection plate 50 of the rotary electric machine unit 10 and inputs a load to the protection plate 50 of the rotary electric machine unit 10 inward in the vehicle width direction, that is, inward in the axial direction. Here, an inertial force is generated in the rotary electric machine unit 10 in the forward direction.

When a load is input to the rotary electric machine unit 10 from the left side by the left side frame 1, the load is transmitted from the protection plate 50 to the rotary electric machine unit 10 via two systems.

The first system is a system in which a part of the load input to the protection plate 50 from the left side is transmitted to the plurality of protrusions 35 of the protruding member 34 from the first load input area 53 of the protection plate 50 via the first storage case 24*a*, and transmitted from the stator yoke portion 26, to which the protruding member 34 is fixed, to the stator core 29, and further transmitted to the second storage case 24*b*.

In such a system, since a part of the load input to the protection plate 50 from the left side is transmitted to the first storage case 24*a* from the first load input area 53 provided outside the first coil end portion 31 in the radial direction, it is possible to prevent the first storage case 24*a* from being in contact with the first coil end portion 31 of the coil 30. As a result, damage to the coil 30 can be reduced, and ground faults and the like can be prevented from occurring in the rotary electric machine 20. In such a system, since a part of the load input to the protection plate 50 from the left side can be received by the highly rigid stator core 29 and second storage case 24*b*, a greater load can be received.

Since the protruding member 34 includes a plurality of protrusions 35 protruding outward farther than the first coil end portion 31 in the axial direction, that is, on the left side in the vehicle width direction, and provided at a position overlapping with the first load input area 53 of the protection plate 50 when viewed from the axial direction, even when the first storage case 24*a* is deformed inward in the axial direction by the load transmitted from the first load input area 53 of the protection plate 50 to the first storage case 24*a*, the first storage case 24*a* is in contact with the protrusion 35 of the protruding member 34 before the first coil end portion 31 of the coil 30. As a result, when the load is input to the rotary electric machine unit 10 from the left side, it is possible to prevent the first storage case 24*a* from being in contact with the first coil end portion 31 of the coil 30. Even if the first storage case 24*a* is broken and the fragments are scattered, the coil cover 33 prevents the first coil end portion 31 from being damaged.

The second system is a system in which the remaining load input to the protection plate 50 from the left side is transmitted from the second load input area 54 of the protection plate 50 to the first bearing 25*a* and the rotor shaft 21 via the case protrusion 37 of the first storage case 24*a* and further transmitted to the second storage case 24*b*.

In such a system, since the remaining load input to the protection plate 50 from the left side can be received by the highly rigid first bearing 25*a*, rotor shaft 21, second bearing 25*b*, and second storage case 24*b*, a greater load can be received. As a result, the inward deformation of the first storage case 24*a* in the axial direction can be reduced, and the contact of the first storage case 24*a* with the first coil end portion 31 of the coil 30 can be further prevented.

Since the second load input area 54 has a substantially cylindrical shape protruding inward in the axial direction, the second load input area 54 has high rigidity, and a greater load can be transmitted from the second load input area 54 to the first bearing 25*a* and the rotor shaft 21. It is possible to further prevent the first storage case 24*a* from being in contact with the first coil end portion 31 of the coil 30.

As such, when a load is input to the rotary electric machine unit 10 from the left side by the left side frame 1, since the load input to the protection plate 50 from the left side is transmitted to the first storage case 24*a* from the first load input area 53 and the second load input area 54 of the protection plate 50, it is possible to prevent the first storage case 24*a* from being in contact with the first coil end portion 31 of the coil 30. As a result, when the load is input to the rotary electric machine unit 10 from the left side by the left side frame 1, damage to the coil 30 of the rotary electric machine 20 can be reduced, and short circuits and ground faults can be prevented from occurring in the rotary electric machine 20. Since the load input to the rotary electric machine unit 10 from the left side of the rotary electric machine unit 10 can be divided and received into two systems of the highly rigid stator core 29, first bearing 25*a*, rotor shaft 21 and second storage case 24*b*, deformation of the first storage case 24*a* can be reduced. As a result, it is possible to ensure a space for the presence of the first coil end portion 31 in the storage case 24, prevent the contact between the storage case 24 and the first coil end portion 31, reduce the damage to the coil 30, and further prevent the occurrence of short circuit or ground fault in the rotary electric machine 20.

When excessive load is input to the protection plate 50 from the left side, then the first bearing chamber 36*a* of the first storage case 24*a* is deformed and the rotation of the rotor shaft 21 is stopped, which can prevent the rotary electric machine 20 from getting into the power generation state, and thereby improving the safety of the rotary electric machine unit 10.

The left side frame 1 moved rearward relative to the vehicle while contacting the outer surface 52 of the protection plate 50 is eventually in contact with the outer protrusion 57 of the protection plate 50, and causes the protection plate 50 to be moved rearward relative to the vehicle. When the left side frame 1 is in contact with the outer protrusion 57 of the protection plate 50 and the protection plate 50 is moved rearward relative to the storage case 24 together with the left side frame 1, the inner protrusion 55 of the protection plate 50 is in contact with the case protrusion 37 of the first storage case 24*a*, and causes the storage case 24 and the rotary electric machine 20 to be moved rearward relative to the vehicle.

Here, as an inertial force is generated in the rotary electric machine unit 10 in the forward direction, by the load received from the inner protrusion 55 of the protection plate 50, which causes the storage case 24 and the rotary electric machine 20 to be moved rearward relative to the vehicle, the storage case 24 and the rotary electric machine 20 can be prevented from being moved forward relative to the vehicle and the left side frame 1.

When the protection plate 50 is moved rearward relative to the storage case 24 together with the left side frame 1 and the inner protrusion 55 of the protection plate 50 is in contact with the case protrusion 37 of the first storage case 24*a*, the case protrusion 37 receives the load from the inner protrusion 55 of the protection plate 50. Here, since the inner protrusion 55 of the protection plate 50 and the case protrusion 37 are provided at a position overlapping with at least one of the first bearing 25*a* and the rotor shaft 21 when viewed from the axial direction, the load received by the case protrusion 37 from the inner protrusion 55 of the protection plate 50 is transmitted to the highly rigid first bearing 25*a* and rotor shaft 21. As a result, when the left side frame 1 inputs a load to the rotary electric machine unit 10 while being relatively moved or deformed rearward, the deformation of the first storage case 24*a* can be reduced, thereby preventing the rotary electric machine unit 10 from being moved forward relative to the vehicle and the left side frame 1, while further preventing the contact of the first storage case 24*a* with the first coil end portion 31 of the coil 30.

Modified Example

Figure 4:
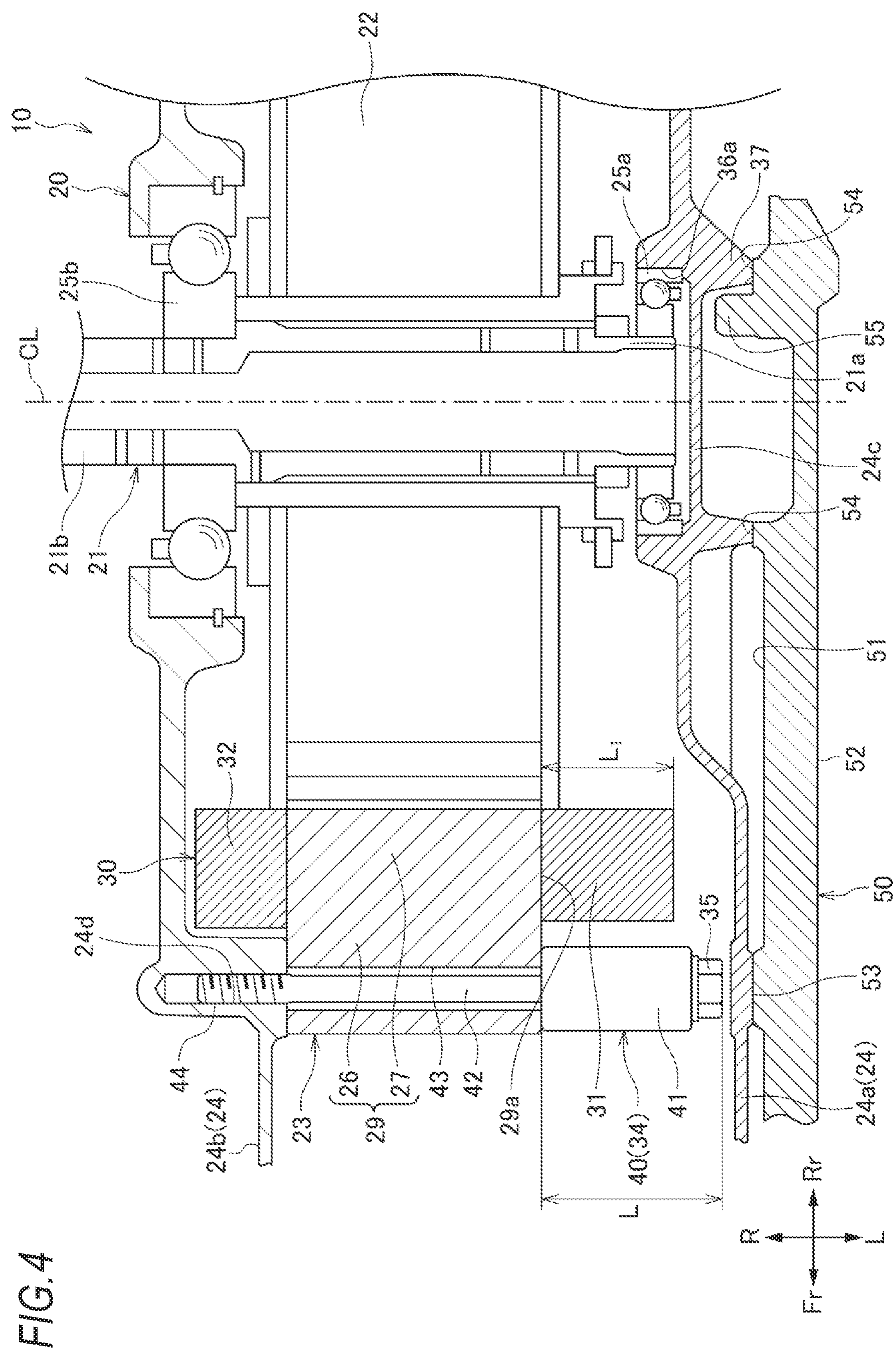
FIG. 4 is a cross-sectional view illustrating a main part of a modified example of the rotary electric machine unit of the present disclosure.

FIG. 4 is an enlarged cross-sectional view illustrating a rotary electric machine unit of a modified example. As illustrated in FIG. 4, in the rotary electric machine unit 10 of the modified example, the protruding member 34 is a stepped bolt 40 for fixing the stator 23 to the storage case 24. Other configurations are the same as those of the rotary electric machine unit 10 of the embodiment described above, and the same elements will be designated by the same or equivalent reference numerals, and detailed description thereof will be omitted.

The stepped bolt 40 includes a large diameter portion 41 and a small diameter portion 42. The small diameter portion 42 having a male screw 44 formed at a tip thereof is inserted into a through hole 43 formed in the stator yoke portion 26 of the stator core 29, and the male screw 44 is screwed into a female screw 24*d* of the second storage case 24*b* to fix the stator core 29 to the second storage case 24*b*. As a result, the stator 23 is fixed to the storage case 24.

The axial length L of the large diameter portion 41 protruding from the stator core 29 is longer than the axial length L1 of the first coil end portion 31. Therefore, the large diameter portion 41 of the stepped bolt 40 includes the protrusion 35 protruding outward farther than the first coil end portion 31 in the axial direction. The stepped bolt 40 acts in the same manner as the protruding member 34 of the embodiment to protect the first coil end portion 31.

According to the rotary electric machine unit 10 of the modified example, since the stepped bolt 40 for fixing the stator 23 to the storage case 24 also has the function of the protruding member 34, it is possible to prevent the first storage case 24*a* from being in contact with the first coil end portion 31 when a load is input to the rotary electric machine unit 10 from the left side, without adding number of parts.

When a bending load is applied to the stepped bolt 40, it is preferable to reduce the hole diameter of the through hole 43 of the stator yoke portion 26 to narrow the gap between the through hole 43 and the small diameter portion 42 to prevent the stepped bolt 40 from collapsing or deforming. By configuring the stepped bolt 40 as a knock bolt and press-fitting the same into the through hole 43 of the stator yoke portion 26, it is possible to further improved the rigidity of the stepped bolt 40 and reduce the bending stress.

Although the embodiments of the present disclosure have been described above, the present disclosure is not limited to the above embodiments, and can be appropriately modified, improved, and the like.

For example, in the present embodiment, it is described that the rotary electric machine unit 10 is provided on the left side of the vehicle, but the rotary electric machine unit 10 can also be provided on the right side.

For example, in the present embodiment, the protruding member 34 is fixed to the stator yoke portion 26 of the left end surface 29*a* of the stator core 29, but may be provided to be fixed to the first storage case 24*a* and protruded inward in the axial direction. Here, since the axial length L of the protruding member 34 is longer than the axial length L1 of the first coil end portion 31, even when the load is input to the rotary electric machine unit 10 from the left side and the first storage case 24*a* is deformed inward in the axial direction by the load transmitted to the first storage case 24*a* from the first load input area 53 of the protection plate 50, the protruding member 34 of the first storage case 24*a* is in contact with the stator yoke portion 26 of the stator core 29 before the first storage case 24*a* is in contact with the first coil end portion 31 of the coil 30. As a result, when a load is input to the rotary electric machine unit 10 from the left side, it is possible to further prevent the first storage case 24*a* from being in contact with the first coil end portion 31 of the coil 30.

At least the following matters are described herein. While the corresponding components and the like in the embodiments described above are shown in parenthesis, the present disclosure is not limited thereto.

(1) A rotary electric machine unit (rotary electric machine unit 10) including a rotor shaft (rotor shaft 21), a rotary electric machine (rotary electric machine 20) including a rotor (rotor 22) having a substantially annular shape and configured to be fixed to an outer peripheral surface of the rotor shaft, and a stator (stator 23) configured to be provided at a predetermined interval in a radial direction from an outer peripheral surface of the rotor, a storage case (storage case 24) configured to store the rotary electric machine, and a protection plate (protection plate 50) configured to be attached to an outer surface of the storage case, in which a first end portion (left end portion 21*a*) on one end side (left side) of the rotor shaft in an axial direction is pivotally supported by a bearing (first bearing 25*a*) provided on a first side surface (left side surface 24*c*) on one end side of the storage case in the axial direction, the stator includes a stator core (stator core 29) including a stator yoke portion (stator yoke portion 26) having a substantially annular shape, and a coil (coil 30) configured to be attached to the stator core inside the stator yoke portion in a radial direction, the coil includes a first coil end portion (first coil end portion 31) protruding outward in the axial direction from a first end surface (left end surface 29*a*) on the one end side of the stator core in the axial direction, the protection plate is at least partly provided on the first side surface of the storage case, and includes a first load input area (first load input area 53) provided outside the first coil end portion in the radial direction and at a position overlapping with the stator core when viewed from the axial direction, and a second load input area (second load input area 54) provided at a position overlapping with at least one of the bearing and the rotor shaft when viewed from the axial direction, and when a load is input to the rotary electric machine unit from the one end side in the axial direction, the load is transmitted to the storage case from the first load input area and the second load input area of the protection plate.

According to (1), the protection plate is provided outside the first coil end portion in the radial direction and includes a first load input area provided at a position overlapping with the stator core when viewed from the axial direction, and a second load input area provided at a position overlapping with at least one of the bearing and the rotor shaft when vied from the axial direction. When a load is input to the rotary electric machine unit from one end side in the axial direction, the load is transmitted from the first load input area and the second load input area of the protection plate to the storage case, and accordingly, it is possible to prevent the storage case from being in contact with the first coil end portion of the coil. As a result, when a load is input to the rotary electric machine unit from one end side in the axial direction, damage to the coil of the rotary electric machine can be reduced, and ground faults and the like can be prevented from occurring in the rotary electric machine.

(2) The rotary electric machine unit according to (1), in which the second load input area has a substantially cylindrical shape when viewed from the axial direction.

According to (2), since the second load input area has a substantially cylindrical shape when viewed from the axial direction, when a load is input to the rotary electric machine unit from one end side in the axial direction, a greater load can be transmitted from the second load input area to the bearing and the rotor shaft. As a result, when a load is input to the rotary electric machine unit from one end side in the axial direction, it is possible to further prevent the storage case from being in contact with the first coil end portion of the coil.

(3) The rotary electric machine unit according to (1) or (2), in which a protruding member (protruding member 34) provided with a protrusion (protrusion 35) protruding outward farther than the first coil end portion in the axial direction is provided between the stator yoke portion and the first side surface of the storage case in the axial direction, the protrusion is provided at a position overlapping with the first load input area of the protection plate when viewed from the axial direction, and the protruding member has a length in the axial direction longer than the length in the axial direction of the first coil end portion.

According to (3), the protruding member includes a protrusion protruding outward farther than the first coil end portion in the axial direction, and the protrusion is provided at a position overlapping with the first load input area of the protection plate when viewed from the axial direction, such that, when a load is input to the rotary electric machine unit from one end side in the axial direction and the rotary electric machine unit is deformed inward in the axial direction by the load transmitted to the storage case from the first load input area of the protection plate, the storage case is in contact with the protrusion of the protruding member prior to the first coil end portion of the coil.

Since the length of the protruding member in the axial direction is longer than the length of the first coil end portion in the axial direction, even when the load is input to the rotary electric machine unit from one end side in the axial direction and the storage case is deformed inward in the axial direction by the load transmitted from the first load input area of the protection plate to the storage case, the protruding member is in contact with the stator core before the storage case is in contact with the first coil end portion.

As a result, when a load is input to the rotary electric machine unit from one end side in the axial direction, it is possible to further prevent the storage case from being in contact with the first coil end portion of the coil.

(4) The rotary electric machine unit according to (3), in which the protruding member is a fastening member (bolt 40) configured to fix the stator to the storage case.

According to (4), since the protruding member is a fastening member configured to fix the stator to the storage case, when a load is input to the rotary electric machine unit from one end side in the axial direction, it is possible to prevent the storage case from being in contact with the first coil end portion of the coil without requiring increased number of parts.

(5) The rotary electric machine unit according to any one of (1) to (4), in which the protection plate includes an inner side surface (inner side surface 51) facing the first side surface of the storage case and an outer surface (outer surface 52) positioned outside the inner side surface in the axial direction, the outer surface of the protection plate is provided with an outer protrusion (outer protrusion 57) protruding outward in the axial direction, the inner side surface of the protection plate is provided with an inner protrusion (inner protrusion 55) protruding inward in the axial direction, a case protrusion (case protrusion 37) protruding outward in the axial direction toward the protection plate is provided on the first side surface of the storage case, the case protrusion of the storage case is provided at a position overlapping with at least one of the bearing and the rotor shaft when viewed from the axial direction, and the inner protrusion is provided inside the case protrusion in the radial direction, and is provided to be overlapped at least partly with the case protrusion in the axial direction.

According to (5), since the outer surface of the protection plate is provided with an outer protrusion protruding outward in the axial direction, when a load input member for inputting a load to the rotary electric machine unit from one end side in the axial direction inputs a load to the rotary electric machine unit while being relatively moved or deformed in the radial direction, the load input member is in contact with the outer protrusion of the protection plate. Since the inner protrusion of the protection plate and the case protrusion of the storage case are provided to overlap at least partly in the axial direction, when the load input member is in contact with the outer protrusion of the protection plate and the protection plate is moved relative to the storage case in the radial direction together with the load input member, the inner protrusion of the protection plate is in contact with the case protrusion of the storage case. As a result, when the load input member inputs a load to the rotary electric machine unit while being relatively moved or deformed in the radial direction, the rotary electric machine unit is prevented from being moved relative to the load input member in the radial direction.

When the load input member is in contact with the outer protrusion of the protection plate and the protection plate is moved relative to the storage case in the radial direction together with the load input member, the inner protrusion of the protection plate is in contact with the case protrusion of the storage case, and the case protrusion of the storage case receives the load from the inner protrusion of the protection plate. Here, since the inner protrusion of the protection plate and the case protrusion of the storage case are provided at a position overlapping with at least one of the bearing and the rotor shaft when viewed from the axial direction, the load received by the case protrusion of the storage case from the inner protrusion of the protection plate is transmitted to the bearing and the rotor shaft. As a result, when the load input member inputs a load to the rotary electric machine unit while being relatively moved or deformed relative to the radial direction, it is possible to prevent the rotary electric machine unit from being moved relative to the load input member in the radial direction while further preventing the storage case from being in contact with the first coil end portion of the coil.

What is claimed is:

1. A rotary electric machine unit comprising:

a rotor shaft;

a rotary electric machine including a rotor having substantially annular shape and configured to be fixed to an outer peripheral surface of the rotor shaft, and a stator configured to be provided at a predetermined interval in a radial direction from an outer peripheral surface of the rotor;

a storage case configured to store the rotary electric machine; and a protection plate configured to be attached to an outer surface of the storage case, wherein:

a first end portion on one end side of the rotor shaft in an axial direction is pivotally supported by a bearing provided on a first side surface on one end side of the storage case in the axial direction:

the stator includes a stator core including a stator yoke portion having a substantially annular shape, and a coil configured to be attached to the stator core inside the stator yoke portion in a radial direction:

the coil includes a first coil end portion protruding outward in the axial direction from a first end surface on the one end side of the stator core in the axial direction:

the protection plate is at least partly provided on the first side surface of the storage case, and includes a first load input area provided outside the first coil end portion in the radial direction and at a position overlapping with the stator core when viewed from the axial direction, and a second load input area provided at a position overlapping with at least one of the bearing and the rotor shaft when viewed from the axial direction; and when a load is input to the rotary electric machine unit from the one end side in the axial direction, the load is transmitted to the storage case from the first load input area and the second load input area of the protection plate.

2. The rotary electric machine unit according to claim 1, wherein the second load input area has a substantially cylindrical shape when viewed from the axial direction.

3. The rotary electric machine unit according to claim 1, wherein:

a protruding member provided with a protrusion protruding outward farther than the first coil end portion in the axial direction is provided between the stator yoke portion and the first side surface of the storage case in the axial direction;

the protrusion is provided at a position overlapping with the first load input area of the protection plate when viewed from the axial direction; and the protruding member has a length in the axial direction longer than the length in the axial direction of the first coil end portion.

4. The rotary electric machine unit according to claim 3, wherein the protruding member is a fastening member configured to fix the stator to the storage case.

5. The rotary electric machine unit according to claim 1, wherein:

the protection plate includes an inner side surface facing the first side surface of the storage case and an outer surface positioned outside the inner side surface in the axial direction;

the outer surface of the protection plate is provided with an outer protrusion protruding outward in the axial direction;

the inner side surface of the protection plate is provided with an inner protrusion protruding inward in the axial direction:

a case protrusion protruding outward in the axial direction toward the protection plate is provided on the first side surface of the storage case:

the case protrusion of the storage case is provided at a position overlapping with at least one of the bearing and the rotor shaft when viewed from the axial direction; and the inner protrusion is provided inside the case protrusion in the radial direction, and is provided to be overlapped at least partly with the case protrusion in the axial direction.

* * * * *